(12) United States Patent
Yoshida (10) Patent No.: US 8,260,524 B2
(45) Date of Patent: Sep. 4, 2012

(54) SENSOR SYSTEM

(75) Inventor: Tomofumi Yoshida, Anjo (JP)

(73) Assignee: Denso Corporation, Kariya (JP)

( * ) Notice: Subject to any disclaimer, the term of this patent is extended or adjusted under 35 U.S.C. 154(b) by 300 days.

(21) Appl. No.: 12/797,070

(22) Filed: Jun. 9, 2010

(65) Prior Publication Data

US 2010/0312457 A1 Dec. 9, 2010

(30) Foreign Application Priority Data

Jun. 9, 2009 (JP) ................................. 2009-138441

(51) Int. Cl.
*B60T 7/12* (2006.01)
*G05D 1/00* (2006.01)
*G06F 7/00* (2006.01)
*G06F 17/00* (2006.01)

(52) U.S. Cl. ........................................ 701/103; 701/106

(58) Field of Classification Search .................... 701/101, 701/102, 103, 104, 105; 123/478, 480, 488, 123/494; 73/114.42, 114.43, 114.45, 114.48; 702/79, 130, 138, 182, 183, 189; 340/286.02
See application file for complete search history.

(56) References Cited

U.S. PATENT DOCUMENTS

| | | | | |
|---|---|---|---|---|
| 6,307,496 | B1 * | 10/2001 | Ikuta et al. | 341/155 |
| 2004/0010389 | A1 * | 1/2004 | Makino et al. | 702/127 |
| 2010/0308979 | A1 * | 12/2010 | Takashima | 340/286.02 |
| 2010/0312501 | A1 * | 12/2010 | Komatsu | 702/50 |
| 2010/0319443 | A1 * | 12/2010 | Nakata et al. | 73/114.45 |

FOREIGN PATENT DOCUMENTS

| | | | |
|---|---|---|---|
| JP | 09-13310 | | 5/1997 |
| JP | 09113310 A | * | 5/1997 |
| JP | 9-252492 | | 9/1997 |
| JP | 10281912 A | * | 10/1998 |

OTHER PUBLICATIONS

Japanese Office Action dated May 31, 2011, issued in corresponding Japanese Application No. 2009-138441 with English Translation.
U.S. Appl. No. 12/817,266, Yamada et al, filed Jun. 17, 2010.
U.S. Appl. No. 12/814,777, Sugiyama et al, filed Jun. 14, 2010.
U.S. Appl. No. 12/813,731, Yamada, filed Jun. 11, 2010.
U.S. Appl. No. 12/796,890, Komatsu, filed Jun. 9, 2010.
U.S. Appl. No. 12/796,904, Sugiyama et al, filed Jun. 9, 2010.
U.S. Appl. No. 12/817,286, Nakata et al, filed Jun. 17, 2010.
U.S. Appl. No. 12/796,845, Takashima, filed Jun. 9, 2010.

* cited by examiner

*Primary Examiner* — Stephen K Cronin
*Assistant Examiner* — Sherman Manley
(74) *Attorney, Agent, or Firm* — Nixon & Vanderhye PC (57) ABSTRACT

A sensor system includes a plurality of sensor units which transmit any one of a pressure detection signal and a temperature detection signal as a detection signal, a processing unit which transmits a switching command signal to the sensor unit and receives a detection signal from the sensor unit, communication lines through which the switching command signal is transmitted from the processing unit to each of the sensor units, and signal lines through which the detection signal is transmitted in a form of analog signal from the sensor unit to the processing unit. The sensor units are grouped into a first group and a second group. A plurality of communication lines of the first group are branched from one first base line connected to a first communication port of the processing unit.

6 Claims, 7 Drawing Sheets

SENSOR SYSTEM

CROSS-REFERENCE TO RELATED APPLICATION

This application is based on Japanese Patent Application No. 2009-138441 filed on Jun. 9, 2009, the disclosure of which is incorporated herein by reference.

FIELD OF THE INVENTION

The present invention relates to a sensor system having a plurality of sensors which respectively detect different physical quantities. Especially, the present invention can be applied to a sensor system having a plurality of sensors mounted on a fuel injector of an internal combustion engine.

BACKGROUND OF THE INVENTION

JP-9-113310A shows a sensor system having a sensor unit, a processing unit and a communication line. The sensor unit includes a first sensor and a second sensor. The first sensor detects a first physical quantity and outputs a first detection signal. The second sensor detects a second physical quantity and outputs a second detection signal. The processing unit receives the first and second signals from the sensor unit through the communication line through which communication signals are transmitted in a form of bit-sequence.

The sensor unit includes a selector (switching circuit) selecting a detection signal which should be outputted. This selector is operated based on a switching command signal which is transmitted from the processing unit with the communication signals. The selected detection signal is converted into a bit-sequence by an A-D converting circuit and is transmitted to the processing unit with the communication signal.

However, in the above-mentioned conventional configuration, since the detection signal is transmitted from the sensor unit to the processing unit with the communication signal in a form of a bit string, a transmission speed of the detection signal is limited at a specified value.

SUMMARY OF THE INVENTION

The present invention is made in view of the above matters, and it is an object of the present invention to provide a sensor system which is capable of transmitting a detection signal from a sensor unit to a processing unit at high speed.

According to the present invention, a sensor system includes a plurality of sensor units, each of which has a first sensor, a second sensor and a switching circuit, a processing unit which transmits a switching command signal to the sensor unit and receives a detection signal from the sensor unit, communication lines through which the switching command signal is transmitted from the processing unit to each of the sensor units, and signal lines through which the first detection signal and the second detection signal are transmitted in a form of analog signal from each of the sensor units to the processing unit.

The sensor units are grouped into a first group including two or more sensor units and a second group including at least one sensor unit. Two or more communication lines corresponding to the first group of the sensor units are branched from a single base line connected to a first communication port of the processing unit.

Since the detection signal is transmitted in a form of analog signal through the signal line, the transmission speed of the detection signal can be made high compared with the case where the detection signal is transmitted in a form of bit string through the communication line.

Since the sensor units switch between the pressure detection signal and the temperature detection signal according to the switching command signal, these signals can be transmitted through one signal line. Thus, the number of the signal line can be reduced compared with the case where the separate signal lines are provided for each detection signal.

Since a plurality of communication lines of first group are branched from one first base line connected to the first communication port of the processing unit, the number of the communication port can be reduced compared with a case where each communication line is connected to each communication port of the processing unit 30.

Since a plurality of sensor units are grouped into the first group and the second group, even if the base line of the first group is faulty, the first physical quantity and the second physical quantity of the second group can be used as those of the first group.

According to another aspect of the present invention, the second group of the sensor units includes two or more sensor units, and two or more communication lines corresponding to the second group of the sensor units are branched from a second base line connected to a second communication port of the processing unit.

According to another aspect of the present invention, the sensor system is applied to an internal combustion engine having a plurality of fuel injectors which injects a fuel into a cylinder during a combustion stroke. Each of the sensor units is provided to each of the fuel injectors. The first sensor detects a pressure of the fuel as the first physical amount, and the second sensor detects a temperature of the first sensor pressure of the fuel as the second physical amount. The sensor units are grouped in such a manner that fuel combustion is sequentially performed in the cylinders corresponding to the first group of the sensor units.

When the sensor units of the first group receive the same switching command signal from the processing unit, all of the sensor units of the first group sequentially transmit the first detection signal.

While the cylinders corresponding to the first group are in the combustion stroke, the sensor units of the first group are maintained to transmit the first detection signal (pressure detection signal). Thus, the number of switching between the first detection signal and the second detection signal can be reduced, whereby a life of the sensor unit can be elongated.

According to another aspect of the present invention, the sensor system includes a plurality of sensor units, a processing unit, communication lines through which the switching command signal is transmitted from the processing unit to each of the sensor units and signal lines through which the first detection signal and the second detection signal are transmitted in a form of analog signal from each of the sensor units to the processing unit. A plurality of the communication lines are branched from a single base line connected to a communication port of the processing unit.

According to another aspect of the present invention, the first sensor detects a pressure of the fuel as the first physical amount, and the processing unit computes a variation in the fuel pressure based on the first detection signal and computes at least one of a fuel injection start timing, a fuel injection period, and a fuel injection quantity based on the computed variation in the fuel pressure.

According to another aspect of the present invention, the processing unit prohibits a switching from the first detection signal to the other detection signal during a fuel injection period.

According to another aspect of the present invention, when the detection signal of the sensor unit is switched to other than the first detection signal (fuel pressure) with respect to a specified cylinder, the processing unit uses the first detection signal (fuel pressure) transmitted from the sensor unit provided to other than the specified cylinder as the first detection signal (fuel pressure) transmitted from the sensor unit provided to the specified cylinder.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Hereafter, embodiments of the present invention will be described. A sensor system is applied to an internal combustion engine (diesel engine) having four cylinders #1-#4. One combustion cycle including four strokes of intake, compression, power, and exhaust is performed in sequence at a cycle of 720° CA with respect to each of four cylinders #1-#4. The combustion is performed in the cylinder#1, #3, #4, and #2 in this series with a deviation of 180° CA.
[First Embodiment]

Figure 1:
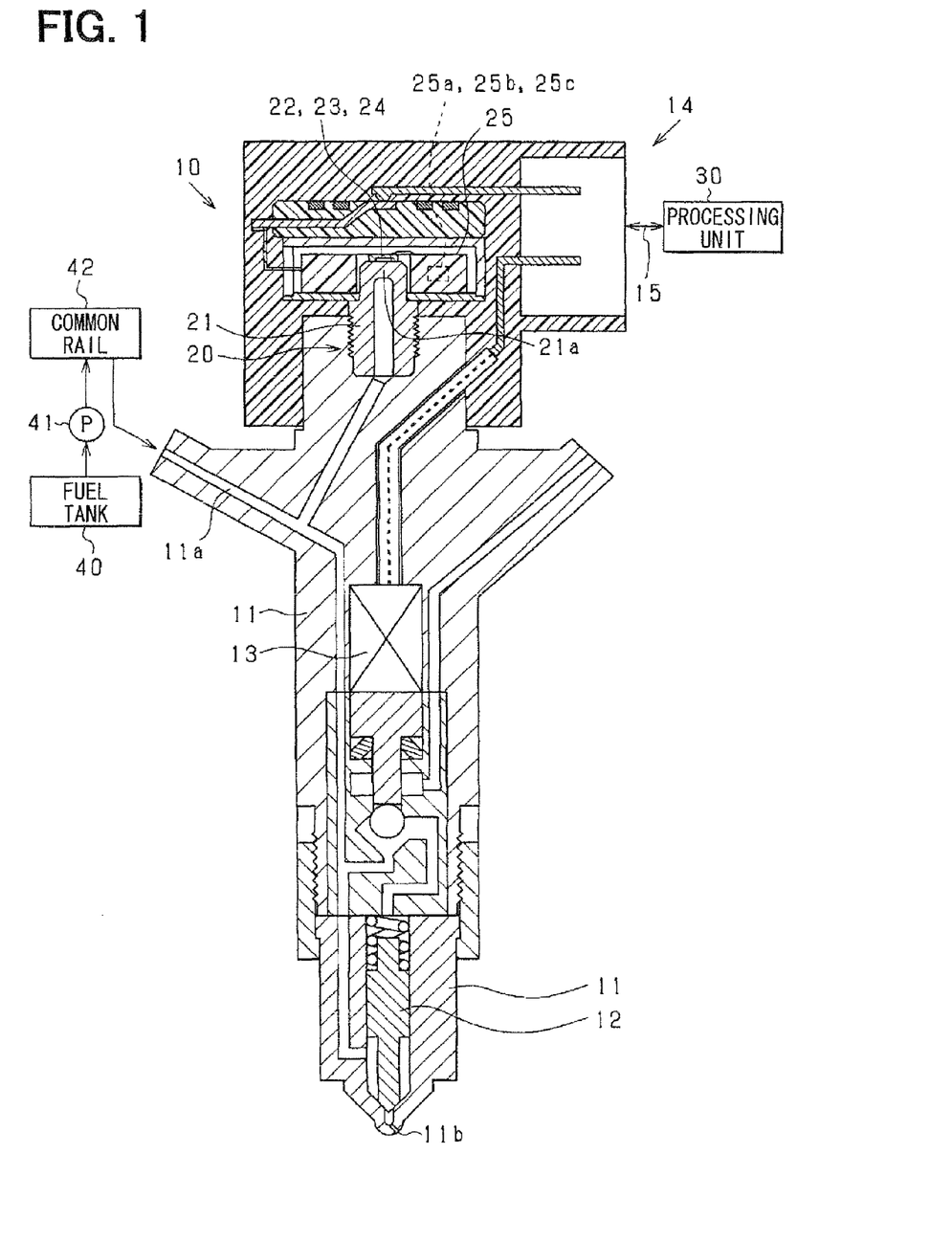
FIG. 1 is a cross-sectional view showing a sensor system in which a sensor unit is provided to a fuel injector, according to a first embodiment of the present invention.

FIG. 1 is a schematic view showing a fuel injector 10, a sensor unit 20, a processing unit 30 and the like.

First, a fuel injection system of the engine including the fuel injector 10 will be explained. A fuel in a fuel tank 40 is pumped up by a high-pressure pump 41 and is accumulated in a common rail 42 to be supplied to each cylinder.

The fuel injector 10 is comprised of a body 11, a needle (valve body) 12, an actuator 13 and the like. The body 11 defines a high pressure passage 11a and an injection port 11b. The needle 12 is accommodated in the body 11 to open/close the injection port 11b. The actuator 13 drives the needle 12.

The processing unit 30 controls the actuator 13 to drive the needle 12. When the needle 12 opens the injection port 11b, high-pressure fuel in the high pressure passage 11a is injected to a combustion chamber (not shown) of the engine. The processing unit 30 computes a fuel injection start timing, a fuel injection end timing, a fuel injection quantity and the like based on an engine speed, an engine load and the like. The actuator 13 is driven to obtain the above computed value.

A structure of the sensor unit 20 will be described hereinafter.

The sensor unit 20 is comprised of a stem (load cell) 21, a pressure sensor (first sensor) 22, a temperature sensor (second sensor) 23, a reference sensor (third sensor) 24, and a molded IC 25. The stem 21 is provided to the body 11. The stem 21 has a diaphragm 21a which elastically deforms in response to high fuel pressure in the high pressure passage 11a. The pressure sensor 22 is disposed on the diaphragm 21a to output a pressure detection signal (first detection signal) depending on an elastic deformation of the diaphragm 21a.

Furthermore, the temperature sensor 23 and the reference sensor 24 are disposed on the stem 21. The temperature sensor 23 outputs a temperature detection signal (second detection signal) depending on a temperature of the stem 21. That is, the temperature sensor 23 outputs the temperature detection signal depending on a temperature of the pressure sensor 22.

The molded IC 25 includes a selector (switching circuit) 25a, a communication circuit 25b and a memory 25c. A connector 14 is provided on the body 11. The molded IC 25 and the processing unit 39 are electrically connected to each other through a harness 15 connected to the connector 14. The harness 15 includes a power line for supplying electricity to the actuator 13, a communication line 15a and a signal line 15b which will be described hereinafter with reference to FIGS. 2 and 3.

Figure 2:
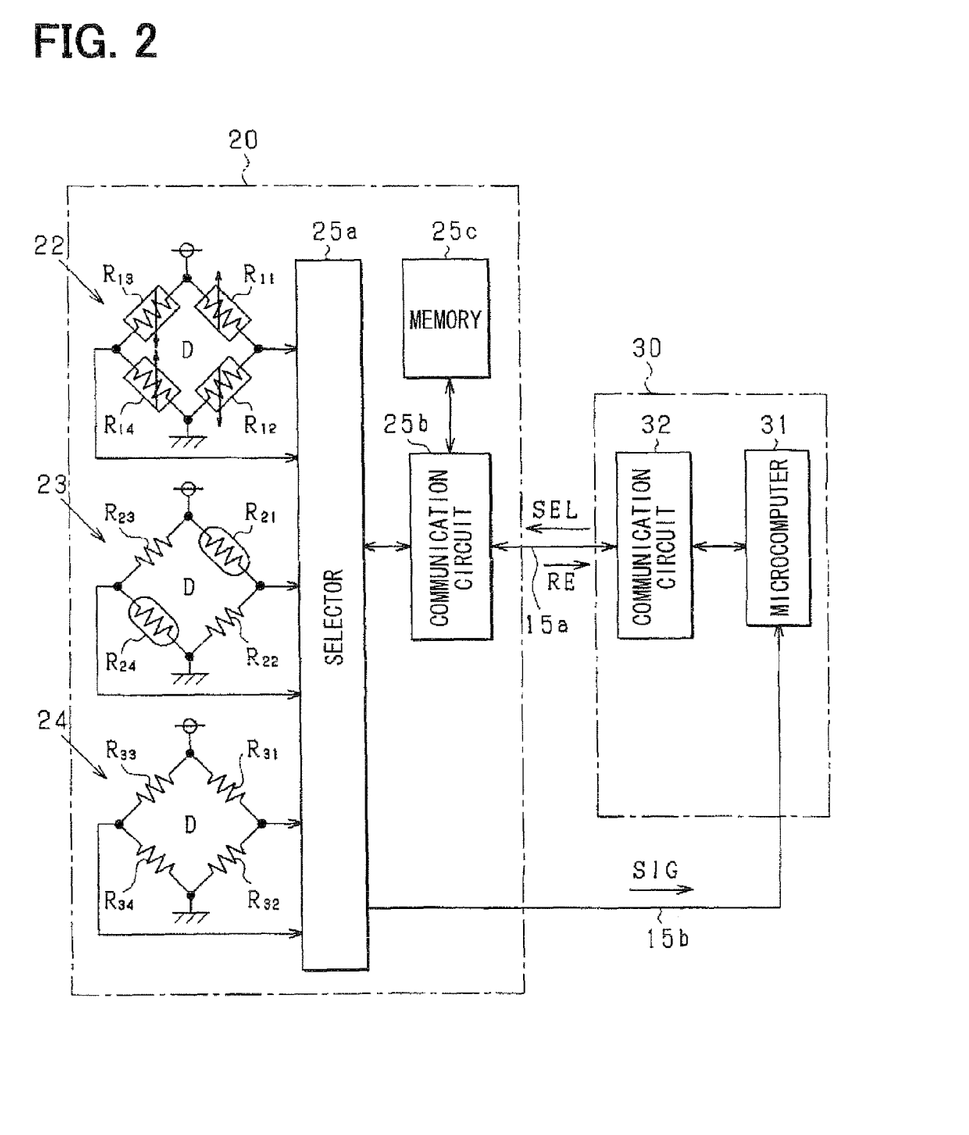
FIG. 2 is a chart showing a circuit configuration of a sensor unit and a processing unit.

FIG. 2 is a chart showing a circuit configuration of the sensor unit 20 and the processing unit 30.

The pressure sensor 22 is comprised of pressure-sensitive resistors R11, R12, R13, R14 of which resistance values vary according to an elastic deformation of the stem 21, that is, a fuel pressure (first physical amount) applied to the diaphragm 21a. These pressure-sensitive resistors R11-R14 forms a bridge circuit.

As the elastic deformation of the stem 21 becomes larger, a midpoint potential of the resistors R11, R12 becomes lower. As the elastic deformation of the stem becomes larger, a midpoint potential of the resistors R13, R14 becomes higher. An electric potential difference between these midpoint potentials is an output of the bridge circuit as a pressure detection signal (first detection signal). It should be noted that the pressure detection signal varies also depending on the temperature of the stem 21, which corresponds to the sensor temperature.

The temperature sensor 23 is comprised of temperature-sensitive resistors R21, R24 of which resistance values vary according to the sensor temperature (second physical amount). These temperature-sensitive resistors R21, R24 and resistors R22, R23 having no temperature characteristic forms a bridge circuit.

There is an electric potential difference between a midpoint potential of the temperature-sensitive resistor R21 and the resistor R22 and a midpoint potential of the resistor R23 and the temperature-sensitive resistor R24. This electric potential difference is an output of the bridge circuit as a temperature detection signal (second detection signal). It should be noted that the temperature detection signal depends on only the sensor memory.

The reference sensor 24 is comprised of reference resistors R31, R32, R33, R34 which have no temperature characteristic. These reference resistors R31-R34 form a bridge circuit. Originally, there is no electric potential difference between two midpoint potentials of the reference resistors R31, R32 and the reference resistors R33, R34. However, an individual difference in the sensor unit 20 may generate an electric potential difference therebetween. This electric potential difference (third physical amount) is outputted as a reference signal (third detection signal).

The selector 25a is a switching circuit which determines which signal is outputted to the processing unit 30 among the pressure detection signal, the temperature detection signal and the reference signal. This switching determination is performed based on a switching command signal "SEL" transmitted from the processing unit 30.

The processing unit 30 has a microcomputer 31 and a communication circuit 32. The microcomputer 31 includes a CPU, a memory and the like. The communication circuit 32 functions as a communication interface. The microcomputer 31 selects one of the pressure detection signal, the temperature detection signal and the reference signal. Based on this selection, the switching command signal "SEL" is transmitted from the processing unit 30 to the sensor unit 20 through communication circuits 32, 25b. This switching command signal "SEL" is a digital signal and is transmitted in a form of a bit string through the communication line 15a.

The signal selected by the selector 25a, which is a detection signal "SIG", is an analog signal and is transmitted to the processing unit 30 through the signal line 15b. In the processing unit 30, the detection signal "SIG" is converted into a digital signal.

At a time when the selector 25a selects the signal based on the switching command signal "SEL", a response signal RE is transmitted from the sensor unit 20 to the processing unit 30. Thereby, since the microcomputer 31 can recognize a switching timing of the detection signal "SIG", the microcomputer 31 can correctly recognize the detection signal "SIG" among the pressure detection signal, the temperature detection signal, and the reference signal.

It should be noted that the communication line 15a electrically connecting both of the communication circuits 32, 25b transmits the switching command signal "SEL" and the response signal RE. It is possible to perform a two-way communication through the communication line 15a. Meanwhile, the signal line 15b can transmit the detection signal "SIG" in a direction from the sensor unit 20 to the processing unit 30.

Figure 3:
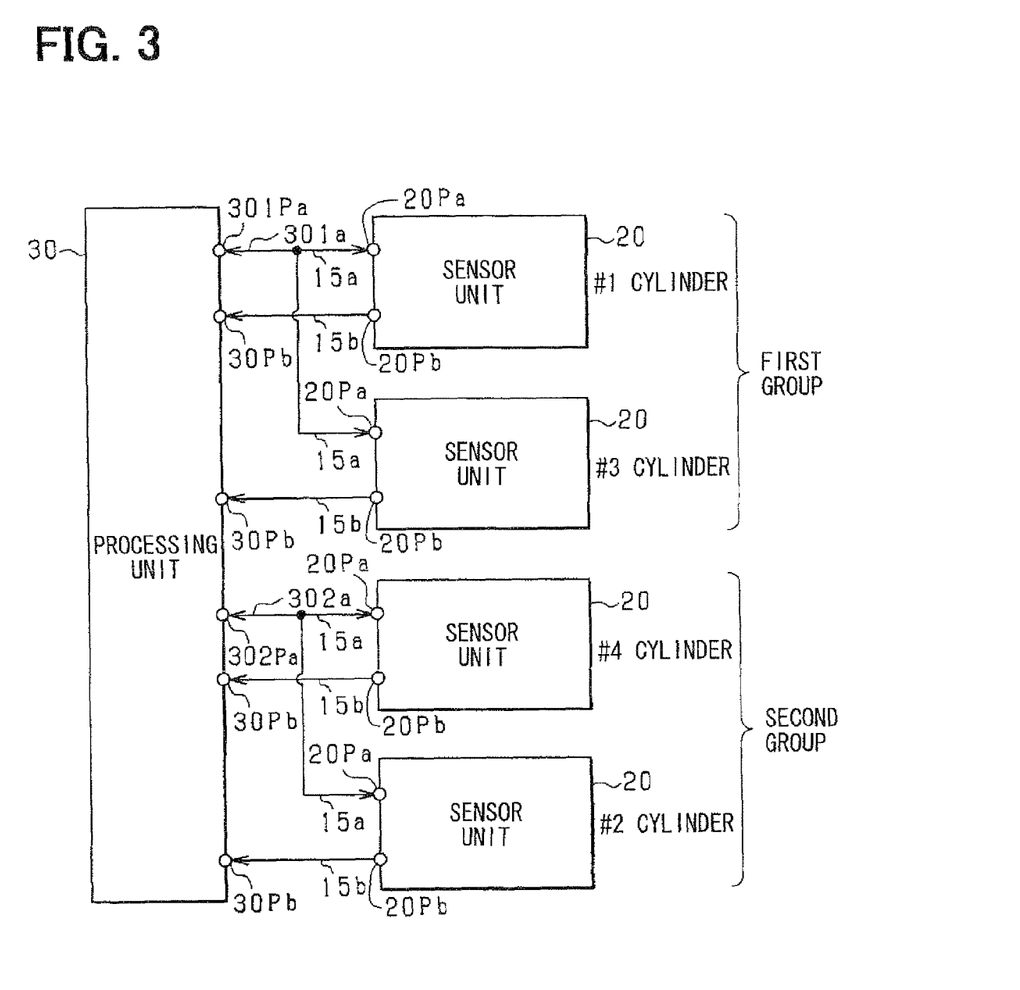
FIG. 3 is a block diagram showing a connecting configuration between the sensor units and the processing unit according to the first embodiment.

FIG. 3 is a chart showing a connecting configuration of the sensor unit 20 and the processing unit 30. The sensor unit 20 is provided to each of four cylinders #1-#4.

The signal line 15b is connected to each of the sensor units 20 (#1-#4). One end of the signal line 15b is connected to a signal port 20Pb of each sensor unit 20, and the other end of the signal line 15b is connected to a communication port 30Pb of the processing unit 30.

The communication line 15a is provided to each of the sensor units 20, and one end of each communication line 15a is connected to a communication port 20Pa of each sensor unit 20. The other end of each communication line 15a is connected to a base line 301a or 302a. In other word, two communication lines 15a are branched from a first base line 301a connected to a first communication port 301Pa of the processing unit 30, and the other two communication lines 15a are branched from a second base line 302a connected to a second communication port 302Pa.

Specifically, as shown in FIG. 3, the sensor units 20 are grouped into a first group and a second group. The sensor units 20 corresponding to #1 cylinder and #3 cylinder are referred to as the first group, and the sensor units 20 corresponding to #4 cylinder and #2 cylinder are referred to as the second group.

The communication lines 15a corresponding to the first group are electrically connected to the first base line 301a so that the communication lines 15a are connected to a first communication port 301Pa. The communication lines 15a corresponding to the second group are electrically connected to the second base line 302a so that the communication lines 15a are connected to a second communication port 302Pa.

Thus, the common switching command signal "SEL" is transmitted to the sensor units 20 of the first group through the first base line 301a. Similarly, the common switching command signal "SEL" is transmitted to the sensor units 20 of the second group through the second base line 302a. The same kind of the detection signal out of the pressure detection signal, the temperature detection signal and the reference detection signal is transmitted from the sensor units 20 of the first group to the processing unit 30 at the same timing. Similarly, the same kind of the detection signal out of the pressure detection signal, the temperature detection signal and the reference detection signal is transmitted from the sensor units 20 of the second group to the processing unit 30 at the same timing.

Figure 4:
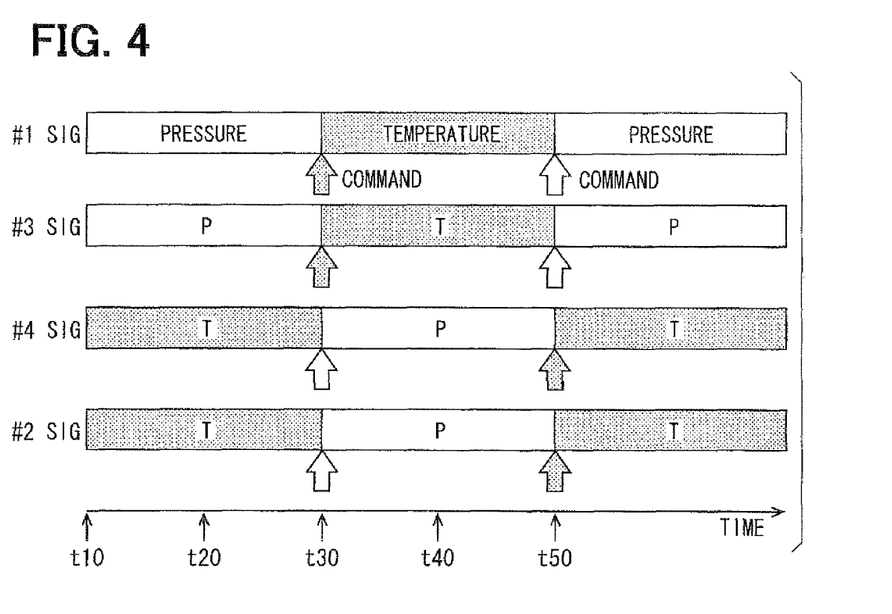
FIG. 4 is a time chart showing switch timings of the detection signals "SIG" with respect to each cylinder according to the first embodiment.

Referring to FIG. 4, a switching timing of the detection signal will be described. FIG. 4 is a chart showing temporal variation in the detection signal "SIG" transmitted from the sensor unit 20 of each cylinder #1-#4.

Since the fuel pressure tends to change rapidly compared with the sensor temperature, a time period in which the pressure detection signal is transmitted as the detection signal "SIG" is longer than a time period in which the temperature detection signal is transmitted. Especially, during a period in which the fuel injector 10 is injecting the fuel, the pressure detection signal is selected and transmitted to the processing unit 30 as the detection signal "SIG". As described later with reference to FIGS. 5A to 5C, a fuel pressure variation waveform is obtained during a fuel injection period so that a variation in a fuel injection rate is estimated. Thus, during a period of fuel injection, it is prohibited that the pressure detection signal is switched to the temperature detection signal or the reference signal as the detection signal "SIG".

In FIG. 4, a time period from t10 to t20 represents a combustion stroke of the cylinder #1, a time period from t20 to t30 represents a combustion stroke of the cylinder #3, a time period from t30 to t40 represents a combustion stroke of the cylinder #4, and a time period from t40 to t50 represents a combustion stroke of the cylinder #2. That is, the fuel combustion is sequentially performed in the cylinders #1, #3, #4, #2 in this order.

Since the detection signal "SIG" is switched between the pressure detection signal, the temperature detection signal and the reference signal according to the common switching command signal "SEL" in the same group of the sensor unit 20, the switching command signal "SEL" for outputting the pressure detection signal is transmitted from the first communication port 301Pa to the sensor unit 20 of the first group during a period from t10 to t30 in which the fuel combustion is performed in the cylinders #1, #3. As a result, during a period from t10 to t30, the pressure detection signal is transmitted from the sensor units 20 of the first group to the processing unit 30. The fuel combustion is sequentially performed in the cylinders #1, #3 of the first group.

Regarding the second group, the switching command signal "SEL" for outputting the pressure detection signal is transmitted from the second communication port 302Pa to the sensor unit 20 of the second group during a period from t30 to t50 in which the fuel combustion is performed in the cylinders #4, #2. As a result, during a period from t30 to t50, the pressure detection signal is transmitted from the sensor units 20 of the second group to the processing unit 30. The fuel combustion is sequentially performed in the cylinders #4, #2 of the second group.

As described above, the microcomputer 31 of the processing unit 30 can obtain the fuel pressure and the sensor temperature with respect to each fuel injector 10 mounted on each cylinder #1-#4.

When the detection signal "SIG" of a specified injector is other than the pressure detection signal, the pressure detection signal of another group injector is used as the pressure detection signal of the specified injector. It is preferable that the pressure detection signal of the other injector which is not injecting the fuel is used.

Similarly, when the detection signal "SIG" of a specified injector is other than the temperature detection signal, the temperature detection signal of another group injector is used as the temperature detection signal of the specified injector.

Therefore, as shown in FIG. 4, it is preferable that a pressure detection signal is transmitted from any one of first group cylinder and the second group cylinder, so that all detection signals "SIG" do not become other than a pressure detection signal at the same time. Also, it is preferable that a temperature detection signal is transmitted from any one of the first group cylinder and the second group cylinder, so that all detection signals "SIG" do not become other than a temperature detection signal at the same time.

As described above, the pressure detection signal varies depending on the sensor temperature as well as the fuel pressure. That is, even if actual fuel pressure is constant, the pressure detection signal varies depending on the sensor temperature. In view of this point, the microcomputer 31 corrects the obtained fuel pressure based on the obtained sensor temperature in order to perform a temperature compensation. Moreover, the obtained fuel pressure is corrected based on the reference signal obtained as the detection signal "SIG".

The memory 25c stores the correction data for correcting characteristics variation and individual difference of the sensors 22, 23. These correction data are transmitted from the communication circuit 25b to the processing unit 30 through the communication line 15a in a form of the bit string. In addition to the temperature compensation mentioned above, the microcomputer 31 corrects the compensated fuel pressure based on the correction data.

The microcomputer 31 (fuel pressure computing means) computes a final fuel pressure by correcting the fuel pressure obtained from the pressure detection signal based on the sensor temperature, the reference signal and the correction data.

Furthermore, the microcomputer 31 (injection mode computing means) computes a fuel injection mode representing a fuel injection start timing, a fuel injection period, a fuel injection quantity and the like.

Figure 5A:
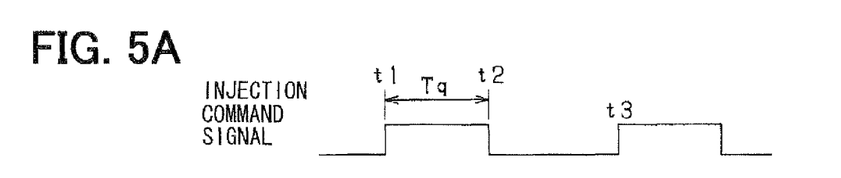
FIGS. 5A to 5C are time charts showing a relationship between a waveform of detection pressure and a waveform of injection rate in a case of a single-stage injection according to the first embodiment.
Figure 5B:
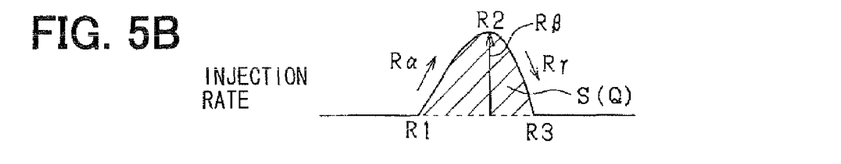
Figure 5C:
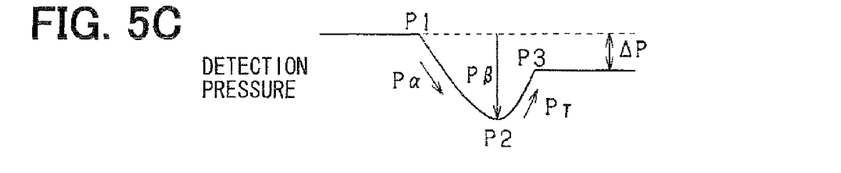

Referring to FIGS. 5A-5C, a computation method of the injection mode will be described hereinafter.

FIG. 5A shows injection command signals which the processing unit 30 outputs to the actuator 30. Based on this injection command signal, the actuator 13 operates to open the injection port 11b. That is, a fuel injection is started at a pulse-on timing t1 of the injection command signal, and the fuel injection is terminated at a pulse-off timing t2 of the injection command signal, During a time period Tq from the timing t1 to the timing t2, the injection port 11b is opened. By controlling the time period "Tq", the fuel injection quantity "Q" is controlled.

FIG. 5B shows a variation in fuel injection rate and FIG. 5C shows a variation waveform in detection pressure. The detection signal "SIG" (pressure detection signal) is transmitted to the microcomputer 31 through the signal line 15b at high speed in such a manner as to obtain the variation waveform in the detection pressure. For example, during one fuel injection, the fuel pressure is detected tenth or more.

Since the variation in the detection pressure and the variation in the injection rate have a relationship described below, a waveform of the injection rate can be estimated based on a waveform of the detection pressure. That is, after the injection command signal rises at the timing t1 the fuel injection is started and the injection rate starts to increase at a timing R1. When the injection rate starts to increase at the timing R1, the detection pressure starts to decrease at a timing P1. Then, when the injection rate reaches the maximum injection rate at a timing R2, the detection pressure drop is stopped at a timing P2. When the injection rate starts to decrease at a timing R2, the detection pressure starts to increase at a timing P2. Then, when the injection rate becomes zero and the actual fuel injection is terminated at a timing R3, the increase in the detection pressure is stopped at a timing P2.

As described above, by detecting the timings P1 and P3, the injection start timing R1 and the injection terminate timing R3 can be computed. Based on a relationship between the variation in the detection pressure and the variation in the fuel injection rate, which will be described below, the variation in the fuel injection rate can be estimated from the variation in the detection pressure.

That is, a decreasing rate Pα of the detection pressure from the timing P1 to the timing P2 has a correlation with an increasing rate Rα of the injection rate from the timing R1 to the timing R2. An increasing rate Pγ of the detection pressure from the timing P2 to the timing P3 has a correlation with a decreasing rate Rγ of the injection rate from the timing R2 to the timing R3. A maximum pressure drop amount Pβ of the detected pressure has a correlation with a maximum injection rate Rβ. Therefore, the increasing rate Rα of the injection rate, the decreasing rate Rγ of the injection rate, and the maximum injection rate Rβ can be computed by detecting the decreasing rate Pα of the detection pressure, the increasing rate Pγ of the detection pressure, and the maximum pressure drop amount Pβ of the detection pressure. The variation in the injection rate (variation waveform) shown in FIG. 5B can be estimated by computing the timings R1, R3, the rates Rα, Rγ, and the maximum injection rate Rβ.

Furthermore, an integral value "S" of the injection rate from the timing R1 to the timing R3 (shaded area in FIG. 5B) is equivalent to the injection quantity "Q".

An integral value of the detection pressure from the timing P1 to the timing P3 has a correlation with the integral value "S" of the injection rate. Thus, the integral value "S" of the injection rate, which corresponds to the injection quantity "Q", can be computed by computing the integral value of detection pressure.

According to the present embodiment described above, following advantages can be obtained.

(1) The switching command signal "SEL" is transmitted from the processing unit 30 to the sensor unit 20 through the communication line 15a, and the detection signal "SIG" is transmitted from the sensor unit 20 to the processing unit 30 through the signal line 15b. Since the detection signal "SIG" is transmitted in a form of analog signal through the signal line 15b, the transmission speed of the detection signal "SIG" can be made high compared with the case where the detection signal "SIG" is transmitted in a form of bit string through the communication line 15a.

(2) Since the selector 25a switches between the pressure detection signal and the temperature detection signal according to the switching command signal "SEL", these signals can be transmitted through one signal line 15b. Thus, the number of the signal line 15b can be reduced compared with the case where the separate signal lines are provided for each detection signal.

(3) Since a plurality of communication lines 15a of first group are branched from one first base line 301a connected to the first communication port 301Pa of the processing unit 30, the number of the communication port can be reduced compared with a case where each communication line is connected to each communication port of the processing unit 30. Also, with respect to the communication lines 15a of the second group, the number of communication ports can be reduced.

(4) According to the above embodiment, since four sensor units 20 are grouped into the first group and the second group, even if the first base line 301a is faulty, the fuel pressure and the sensor temperature of the second group can be used as those of the first group.

(5) Since the processing unit 30 estimates the variation waveform of the fuel injection rate based on the detected fuel pressure in order to compute the fuel injection mode (actual fuel injection timing R1, fuel injection quantity Q and the like), it is required that the fuel pressure is detected with high resolution so that its locus can be illustrated as shown in FIG. 5C. According to the present embodiment, the detection signal "SIG" can be transmitted at high speed, so that the above requirement is satisfied.

(6) When the detection signal "SIG" of a specified injector is other than the pressure detection signal, the pressure detection signal of the other injector is used as the pressure detection signal of the specified injector. Similarly, the temperature detection signal of the other injector is used as the temperature detection signal of the specified injector.

The pressure detection signal and the temperature detection signal can be switchablly transmitted through one signal line 15b. Thus, the number of the signal line 15b can be reduced, and the fuel pressure and the sensor temperature are always obtained.

[Second Embodiment]

In the first embodiment, each two of the sensor unit 20 is grouped into the first group and the second group. According to the second embodiment, as shown in FIG. 6, a first group includes three sensor units 20 and a second group includes one sensor unit 20.

Figure 6:
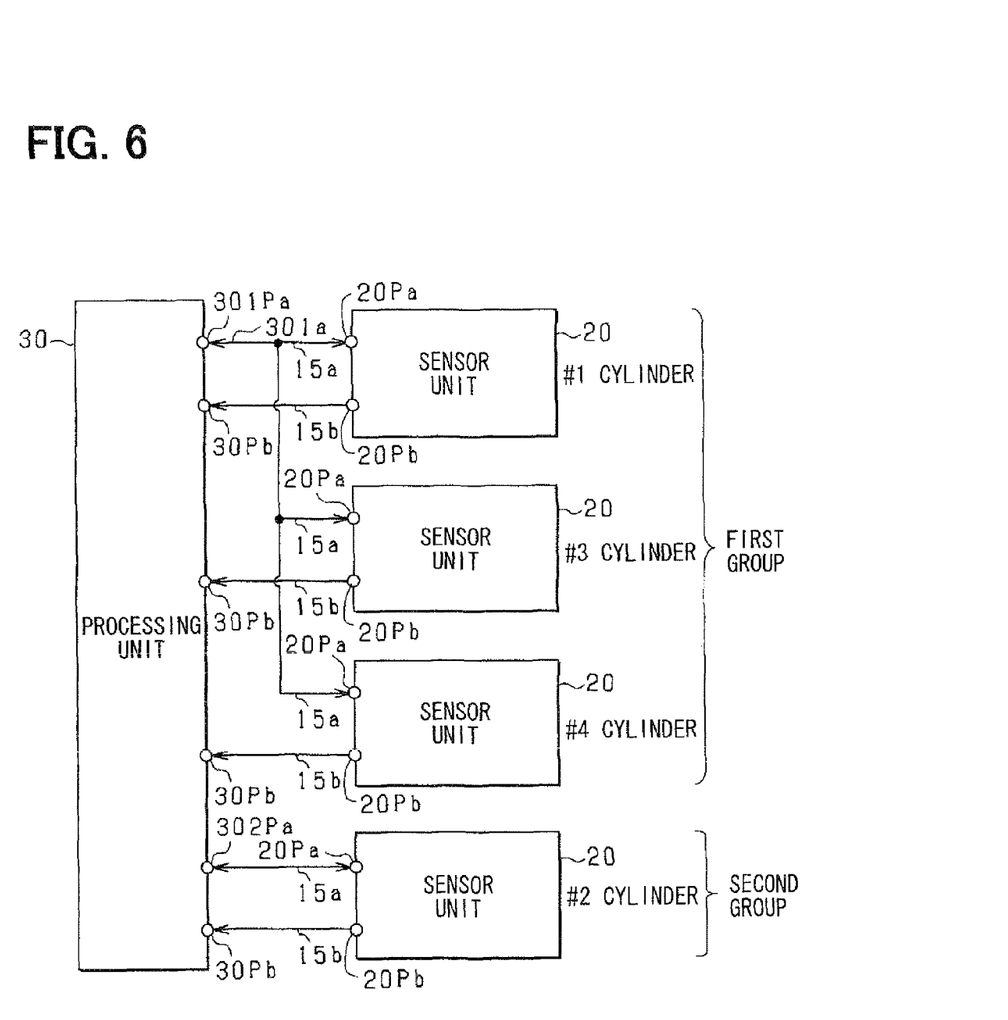
FIG. 6 is a block diagram showing a connecting configuration between the sensor units and the processing unit according to a second embodiment of the present invention.

Referring to FIG. 6, a configuration of the signal lines 15b and the communication lines 15a will be described in detail.

The signal line 15b is provided to each sensor unit 20 (#1-#4) as well as the first embodiment. One end of each signal line 15b is connected to a signal port 20Pb of each sensor unit 20, and the other end of each signal line 15b is connected to respective communication port 30Pb of the processing unit 30.

The communication line 15a is provided to each sensor unit 20, and one end of the communication line 15a is connected to a communication port 20Pa of each sensor unit 20. Each of the other ends of three communication lines 15a is connected to the first base line 301a. In other word, three communication lines 15a are branched from the first base line 301a connected to the first communication port 301Pa of the processing unit 30. The other communication line 15a is directly connected to the second communication port 302Pa of the processing unit 30.

The sensor units 20 corresponding to the cylinders #1, #3, #4 belong to the first group and the sensor unit 20 corresponding to the cylinder #2 belongs to the second group.

A common switching command signal "SEL" is transmitted from the processing unit 30 to three sensor units 20 of the first group through the first base line 301a. The same kind of the detection signal out of the pressure detection signal, the temperature detection signal and the reference detection signal is transmitted from the sensor units 20 of the first group to the processing unit 30 at the same timing.

Figure 7:
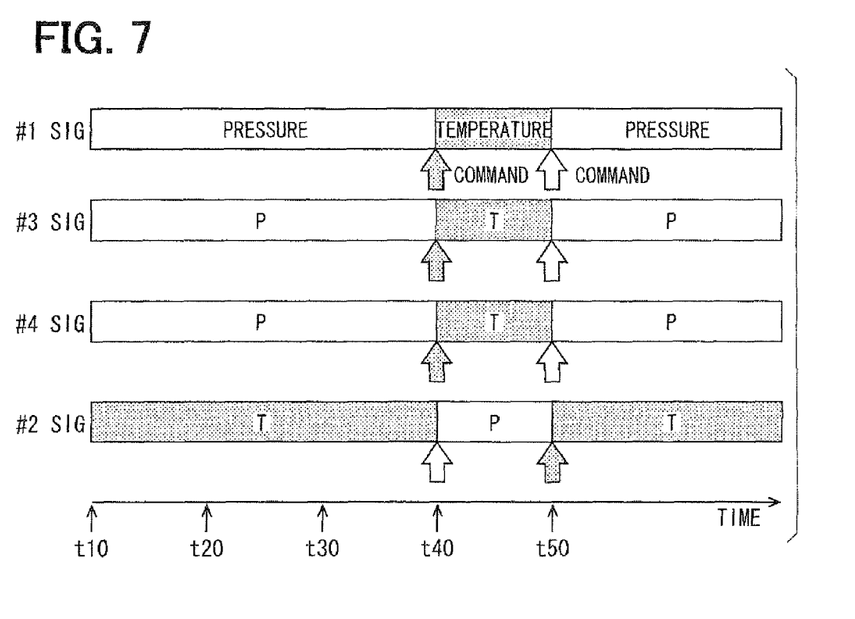
FIG. 7 is a time chart showing switch timings of the detection signals "SIG" with respect to each cylinder according to the second embodiment.

Referring to FIG. 7, a switching timing of the detection signal will be described. FIG. 7 is a chart showing temporal variation in the detection signal "SIG" transmitted from the sensor unit 20 of each cylinder #1-#4.

Since the fuel pressure tends to change rapidly compared with the sensor temperature, a time period in which the pressure detection signal is transmitted as the detection signal "SIG" is longer than a time period in which the temperature detection signal is transmitted. Especially, during a period in which the fuel injector 10 is injecting the fuel, the pressure detection signal is selected and transmitted to the processing unit 30 as the detection signal "SIG". During a period of fuel injection, it is prohibited that the pressure detection signal is switched to the temperature detection signal or the reference signal as the detection signal "SIG".

With respect to the first group, the switching command signal "SEL" for outputting the pressure detection signal is transmitted from the first communication port 301Pa to the sensor unit 20 of the first group during a period from t10 to t40 in which the fuel combustion is performed in the cylinders #1, #3, #4. As a result, during a period from t10 to t40, the pressure detection signal is transmitted from the sensor units 20 of the first group (#1, #3, #4) to the processing unit 30. The fuel combustion is sequentially performed in the cylinders #1, #3, #4 of the first group.

With respect to the second group, the switching command signal "SEL" for outputting the pressure detection signal is transmitted from the second communication port 302Pa to the sensor unit 20 of the second group during a period from t40 to t50 in which the fuel combustion is performed in the cylinder #2.

As a result, during a period from t40 to t50, the pressure detection signal is transmitted from the sensor unit 20 of the second group (#2) to the processing unit 30.

When the detection signal "SIG" of a specified injector is other than the pressure detection signal, the pressure detection signal of another group injector is used as the pressure detection signal of the specified injector. It is preferable that the pressure detection signal of the other injector which is not injecting the fuel is used.

Similarly, when the detection signal "SIG" of a specified injector is other than the temperature detection signal, the temperature detection signal of another group injector is used as the temperature detection signal of the specified injector.

Therefore, as shown in FIG. 7, it is preferable that a pressure detection signal is transmitted from any one of first group cylinder and the second group cylinder, so that all detection signals "SIG" do not become other than a pressure detection signal at the same time. Also, it is preferable that a temperature detection signal is transmitted from any one of first group cylinder and second group cylinder, so that all detection signals "SIG" do not become other than a temperature detection signal at the same time.

According to the second embodiment, the same advantages as the first embodiment can be achieved.

[Third Embodiment]

Figure 8:
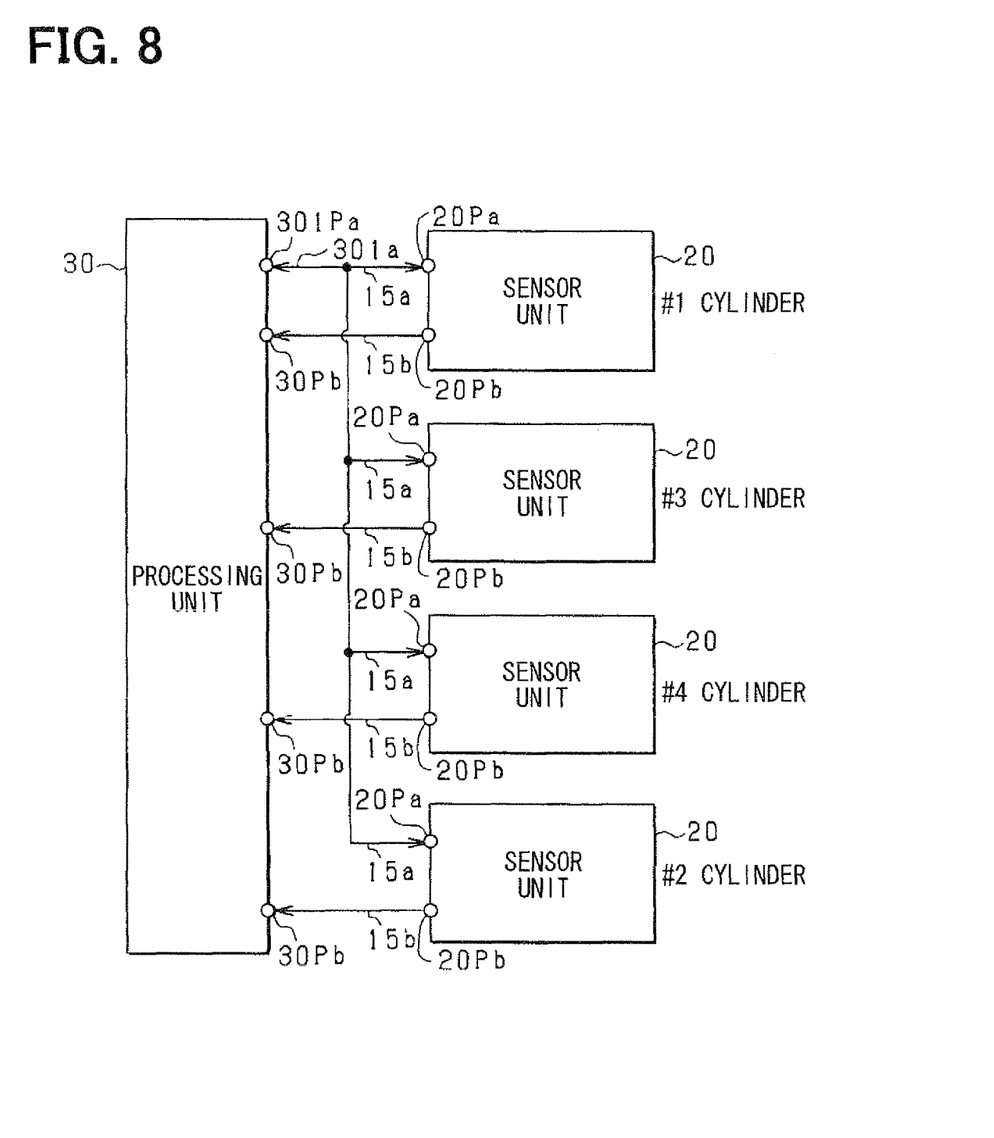
FIG. 8 is a block diagram showing a connecting configuration between the sensor units and the processing unit according to a third embodiment of the present invention.

According to the third embodiment, as shown in FIG. 8, a first group includes all of four sensor units 20. All communication lines 15a are connected to the first base line 301a. In other word, all communication lines 15a are branched from the first base line 301a connected to the first communication port 301Pa of the processing unit 30.

A common switching command signal "SEL" is transmitted from the processing unit 30 to all sensor units 20 through the first base line 301a. Since the fuel pressure tends to change rapidly compared with the sensor temperature, a time period in which the pressure detection signal is transmitted as the detection signal "SIG" is longer than a time period in which the temperature detection signal is transmitted. During a period of fuel injection, it is prohibited that the pressure detection signal is switched to the temperature detection signal or the reference signal as the detection signal "SIG".

According to the third embodiment, the advantages (1)-(3), (5), (6) as the first embodiment can be achieved.

[Other Embodiment]

The present invention is not limited to the embodiments described above, but may be performed, for example, in the following manner. Further, the characteristic configuration of each embodiment can be combined.

In the above embodiments, with respect to each sensor unit 20, the switching command signal "SEL" and the response signal RE are transmitted through one communication line 15a by serial communication. Alternatively, two communication lines 15a are provided for each sensor unit 20, and the switching command signal "SEL" and the response signal RE may be transmitted through each communication line 15a by parallel communication.

In the present invention, the first sensor and the second sensor may detect physical amounts other than the fuel pressure and the sensor temperature.

The internal combustion engine is not limited to four-cylinder engine. The sensor units 20 may be grouped into three or more groups.

In the above embodiments, the same switching command signal "SEL" is transmitted to the sensor units 20 which belong to the same group. Alternatively, different switching command signals "SEL" can be respectively transmitted to the sensor units 20 even if the sensor units 20 belong to the same group. For example, in the first embodiment, the sensor unit 20 (#1) may receive the switching command signal "SEL" to output the pressure detection signal and the other sensor unit 20 (#3) may receive the switching command signal "SEL" to output the temperature detection signal.

In a case that all communication lines 15a are branched from the first base line 301a as shown in FIG. 8, a different switching command signal can be transmitted to each sensor unit 20 in such a manner that each sensor unit 20 outputs the pressure detection signal during the fuel injection period.

What is claimed is:

1. A sensor system comprising:
a plurality of sensor units, each of which respectively includes a first sensor outputting a first detection signal corresponding to a first physical amount, a second sensor outputting a second detection signal corresponding to a second physical amount, and a switching circuit switching between the first detection signal and the second detection signal;
a processing unit which transmits a switching command signal to the switching circuit and receives a detection signal from each of the sensor units;
communication lines through which the switching command signal is transmitted from the processing unit to each of the sensor units; and
signal lines through which the first detection signal and the second detection signal are transmitted in a form of analog signal from each of the sensor units to the processing unit; wherein
the communications lines are separate and distinct from the signal lines,
the sensor units are grouped into a first group including two or more sensor units and a second group including at least one sensor unit, and
two or more communication lines corresponding to the first group of the sensor units are branched from a single first base line connected to a first communication port of the processing unit, wherein:
the sensor system is applied to an internal combustion engine having a plurality of fuel injectors which injects a fuel into a cylinder during a combustion stroke;
each of the sensor units is provided to each of the fuel injectors;
the first sensor detects a pressure of the fuel as the first physical amount;
the second sensor detects a temperature of the first sensor as the second physical amount; and
the sensor units are grouped in such a manner that a fuel combustion is sequentially performed in the cylinders corresponding to the first group of the sensor units.

2. A sensor system according to claim 1, wherein
the second group of the sensor units includes two or more sensor units, and
the communication line corresponding to each of the sensor units is branched from a second base line connected to a second communication port of the processing unit.

3. A sensor system comprising:
a plurality of sensor units, each of which respectively includes a first sensor outputting a first detection signal corresponding to a first physical amount, a second sensor outputting a second detection signal corresponding to a second physical amount, and a switching circuit switching between the first detection signal and the second detection signal;
a processing unit which transmits a switching command signal to the switching circuit and receives a detection signal from each of the sensor units;
communication lines through which the switching command signal is transmitted from the processing unit to each of the sensor units; and
signal lines through which the first detection signal and the second detection signal are transmitted in a form of analog signal from each of the sensor units to the processing unit; wherein
the communications lines are separate and distinct from the signal lines,
a plurality of the communication lines are branched from a single base line connected to a communication port of the processing unit;
the sensor system is applied to an internal combustion engine having a plurality of fuel injectors which injects a fuel into a cylinder during a combustion stroke;
each of the sensor units is provided to each of the fuel injectors;
the first sensor detects a pressure of the fuel as the first physical amount; and
the processing unit computes a variation in the fuel pressure based on the first detection signal and computes at least one of a fuel injection start timing, a fuel injection period, and a fuel injection quantity based on the computed variation in the fuel pressure.

4. A sensor system according to claim 3, wherein
the processing unit prohibits a switching from the first detection signal to the other detection signal during a fuel injection period.

5. A sensor system according to claim 3, wherein
when the detection signal of the sensor unit is switched to other than the first detection signal with respect to a specified cylinder, the processing unit uses the first detection signal transmitted from the sensor unit provided to other than the specified cylinder as the first detection signal transmitted from the sensor unit provided to the specified cylinder.

6. A sensor system according to claim 4, wherein when the detection signal of the sensor unit is switched to other than the first detection signal with respect to a specified cylinder, the processing unit uses the first detection signal transmitted from the sensor unit provided to other than the specified cylinder as the first detection signal transmitted from the sensor unit provided to the specified cylinder.

* * * * *